Figure 1:
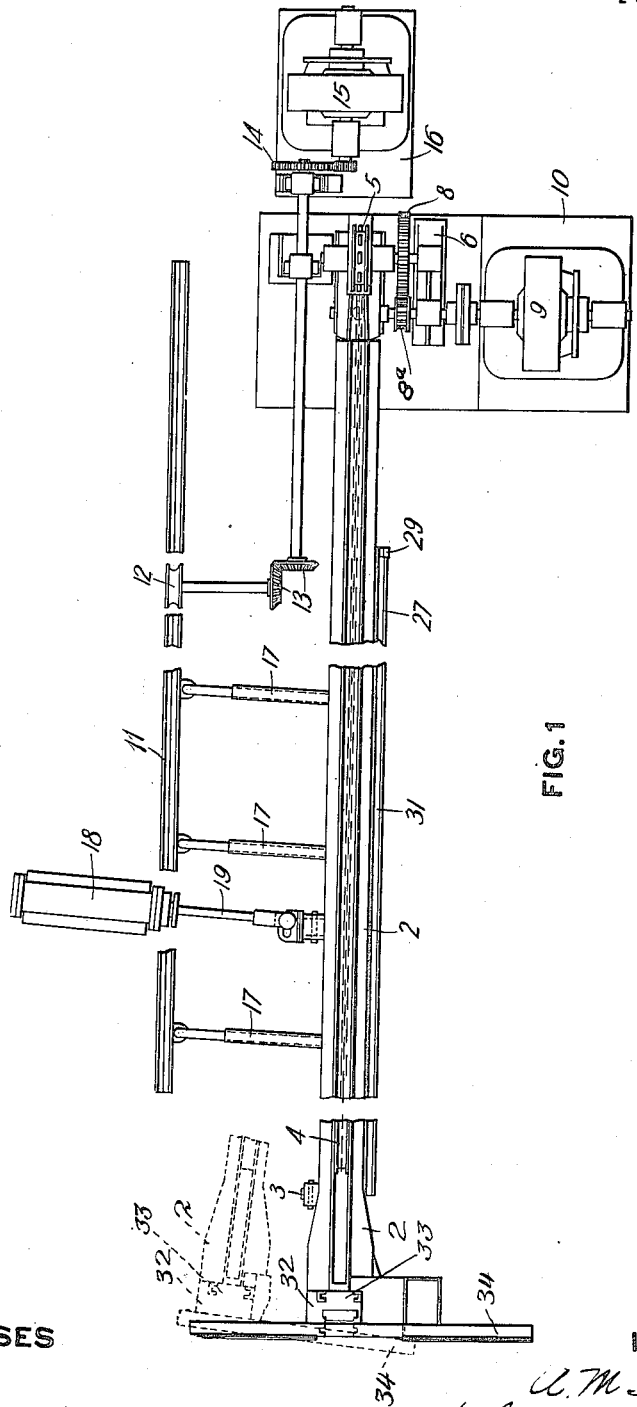

A. M. SAUNDERS.
PIPE DRAWING APPARATUS.
APPLICATION FILED MAY 11, 1911.

1,281,668.

Patented Oct. 15, 1918.
2 SHEETS—SHEET 1.

WITNESSES

INVENTOR

A. M. SAUNDERS.
PIPE DRAWING APPARATUS.
APPLICATION FILED MAY 11, 1911.
1,281,668.
Patented Oct. 15, 1918.
2 SHEETS—SHEET 2.
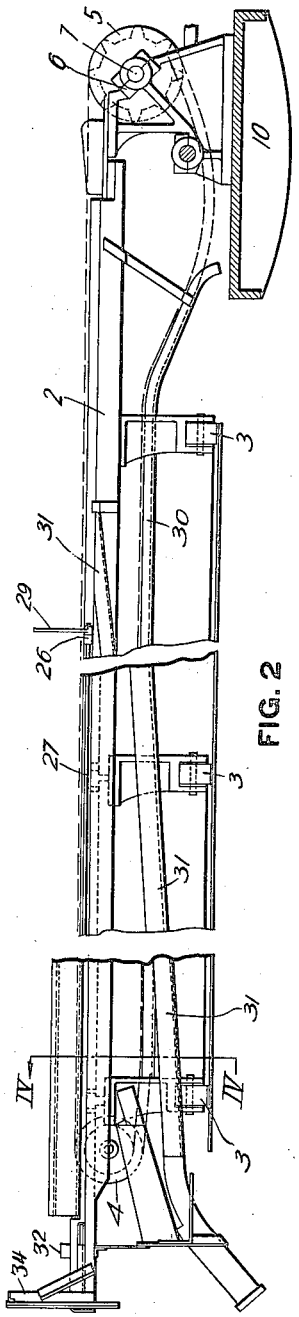
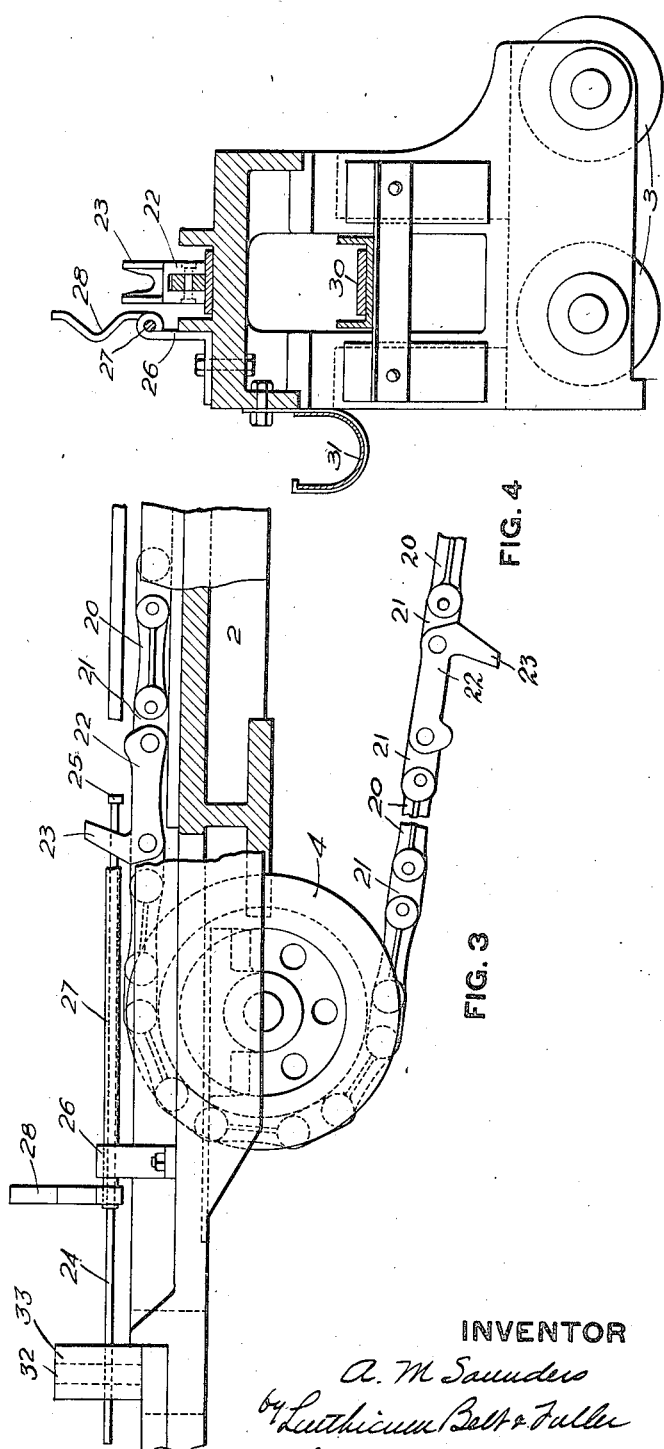
WITNESSES
INVENTOR
A. M. Saunders
by Lutticken Belt & Fuller
his Attorneys

UNITED STATES PATENT OFFICE.

AUGUSTUS M. SAUNDERS, OF McKEESPORT, PENNSYLVANIA, ASSIGNOR TO NATIONAL TUBE COMPANY, OF PITTSBURGH, PENNSYLVANIA, A CORPORATION OF NEW JERSEY.

PIPE-DRAWING APPARATUS.

1,281,668.                     Specification of Letters Patent.      Patented Oct. 15, 1918.

Application filed May 11, 1911. Serial No. 626,547.

*To all whom it may concern:*

Be it known that I, AUGUSTUS M. SAUNDERS, of McKeesport, in the county of Allegheny and State of Pennsylvania, have invented certain new and useful Improvements in Pipe-Drawing Apparatus, of which the following is a specification.

My invention relates to apparatus used in the manufacture of pipe, and more particularly relates to pipe drawing apparatus used in making butt-weld pipe.

Heretofore, with such pipe drawing apparatus, the tongs are attached to an end of the skelp and a welding bell is slipped over the reins of the tongs by the welder or operator. The end of one rein is then attached by a boy to the endless chain on the draw bench by which the skelp is then drawn through the welding bell and butt-welded into a pipe. As the chain travels away from the furnace in pulling or drawing the skelp through the welding bell, the boy slides along with the tongs and, after the pipe is welded and is drawn clear of the welding bell, the boy detaches the tongs from the draw chain which is caused to constantly rotate over the sprocket wheels located on opposite ends of the draw bench on which the chain is mounted.

On account of the speed at which the welding operation is performed it has heretofore been necessary to employ two boys for the purpose of attaching the tongs to and detaching them from the draw chain.

With draw benches of the type to which my invention is shown applied, one end of the bench is pivoted and the other end is arranged to swing in the arc of a circle in front of the discharge door of a welding furnace, the end of the bench being moved into position opposite the end of the successive pipe skelp lying within the furnace.

One object of my invention is to provide pipe drawing apparatus having improved means for drawing the pipe skelp from the welding furnace and through the welding bell after the tongs have been attached in holding engagement with the end of the heated pipe skelp by the welder.

Another object of the invention is to provide pipe drawing apparatus having means for automatically causing engagement of the tongs by the draw chain after attachment of the tongs to the skelp to be welded.

A further object of this invention is to provide improved means for drawing the pipe by which the welding operations are facilitated, the number of operatives is reduced and the labor cost of welding the pipe is decreased.

Referring now to the drawings forming part of this specification, Figure 1 is a plan showing a draw bench constructed and arranged in accordance with my invention. Fig. 2 is a side elevation of the same. Fig. 3 is a detail side elevation of a portion of the apparatus, partly in section, showing the construction of the draw chain and the means employed by which the chain is attached to the end of the tong reins in accordance with my invention. Fig. 4 is a transverse section of the draw bench, the section being taken on the line IV—IV of Fig. 2.

In the accompanying drawings, the draw bench 2 which is pivoted at its rear end and which at its forward end is provided with track wheels 3 is arranged to travel on a track provided for that purpose as from the position shown in full lines in Fig. 1 into that shown by dotted lines. The draw bench when of considerable length as shown is provided with other track wheels 3 at suitable intervals in the length of the draw bench.

Mounted in bearings provided on opposite ends of the draw bench are the shafts of the sprocket wheels 4 and 5. Mounted in bearings 6 on the pivot end of the draw bench 2 is the shaft 7 for the sprocket wheel 5 which drives the draw chain on the bench 2 and on one end of the shaft 7 is a spur gear 8 which meshes with the spur driving pinion 8ª operatively connected by a flexible coupling to the armature shaft of the motor 9 on the base 10. A trough 11 extends lengthwise alongside the draw bench 2 and at the end of the trough 11 are the sizing rolls 12 which are connected by bevel gears 13 and slow down gears 14 to the driving motor 15 on the base 16 located at the end of the draw bench.

The draw bench 2 is pivoted at one end in such manner as to permit the front end of the draw bench to be swung from the position shown in full lines into that shown in dotted lines in Fig. 1 in traversing the width of the discharge door in the welding furnace in front of which the draw bench is operatively mounted. The swinging draw bench is connected by telescopic skids 17 with the stationary trough 11 and the fluid pressure cylinder 18 by which the draw bench is swung on its pivot is operatively connected by its piston rod 19 to the front or swinging end of the draw-bench.

The drive chain is made up of a series of links 20 pivotally secured to the ends of shorter connecting links 21 and at intervals in the length of the chain, the links 20 are replaced by hook links 22 having forked projections 23 on one end thereof so that when the endless draw chain is mounted on the relatively long draw-bench there will be a series of links 22 on the chain having forked projections 23 thereon which will operatively engage the tong reins 24 by grappling with the button or projection 25 on the end of the reins 24.

Mounted in bearings 26 on the side of the draw-bench 2 is a shaft or rod 27 and a keeper 28 is pivoted by one end on the one end of the shaft 27, so as to swing across the top of the draw bench and prevent lifting of the tong reins out of engagement with the forked projections 23 on the chain links 22 when grappled by the forked links. An operating lever or handle 29 is secured by one end to the opposite end of the shaft 27 to manipulate the keeper 28, this shaft extending from the front end of the draw bench to the desired point in its length.

A trough forming a track 30 for the lower side of the draw chain is secured on the draw bench so as to keep the chain from contacting with the floor during its movement over the sprocket wheels and during the swinging movement of the front end of the draw bench in traversing the width of the discharge door of the welding furnace.

At one side of the draw bench an inclined trough 31 is secured in which the tongs are returned to the front end of the draw bench when detached from the pipe after the pipe welding operation has been completed. A stop 32 is provided on the swinging end of the draw bench for the welding bells which are slipped over the tong reins 24 after the tongs are attached to the skelp by the operator known in the art as the welder and are seated in the recess 33 in this stop in the usual known manner. The guard 34 is provided on the swinging end of the draw-bench to prevent the workmen from becoming injured by being squeezed between the furnace front and the swinging draw-bench.

In the operation of my improved apparatus the motor 9 is started and is operated to ordinarily keep the draw chain in constant movement. The forward end of the draw bench is then moved by manipulating the valve controlling the operation of the cylinder 18 until the end of the draw bench is in position in front of the discharge door of the welding furnace and opposite the desired piece of heated skelp. The welder then attaches the gripping jaws of tongs to the end of the heated pipe skelp and slips a welding bell over the end of the reins of the tongs. The bell then engages with the stop 32, against which it rests during the pipe drawing operations in the usual manner, and the outer ends of the reins are laid by the welder in the middle of the width of the draw bench.

An operative at the other end of the draw bench, by means of the lever 29, then swings the bent keeper 28 from the position shown in Figs. 3 and 4 until the keeper 28 extends in a horizontal direction across the width of the draw bench above the reins 24 on the tongs then in holding engagement with the end of a heated pipe skelp located within the furnace. The forked projections 23 on the end of one of the links 22 forming parts of the rapidly moving draw chain then engages with the projection 25 on the reins 24 and, as the chain link 22 in engagement with the reins 24 approaches the rear end of the draw bench the pipe skelp is drawn through the welding bell and is quickly welded into a tube, the keeper 28 acting to prevent the ends of the reins 24 from lifting out of operative engagement with the forked projections 23 on the links 22 at the beginning of each pipe drawing operation.

When the skelp has been drawn through the welding bell and formed into a tube the tongs will be adjacent to the rear end of the draw bench and when this position is reached an operative who has lifted the keeper 28 again into the raised position shown in Figs. 3 and 4, lifts the end of the tong reins 24 out of engagement with the forks 23 on the link 22 of the draw chain so as to disengage the tongs from the draw chain.

The tongs are then detached from the end of the formed pipe preferably by an operative at the rear end of the draw bench who places the tongs in the rear end of the trough 31. This operative then rolls the formed pipe from the draw bench 2 upon the inclined skids 17 extending transversely from the draw bench toward the trough 11 and sizing rolls 12, and the operative manipulating the lever 29 then slides or pushes the tongs lengthwise along the inclined trough 31 where they fall into position to be again picked up by the welder and attached to another pipe skelp within the furnace.

The above described operations are then performed with successive pipe skelp in the continued use of the apparatus.

The advantages of my invention will be apparent to those skilled in the art. By avoiding the use of the usual manually operated clamp or monkey for attaching the tongs to the draw chain, the service of one operative is dispensed with and the cost of making the pipe correspondingly decreased.

By providing means by which the ends of the tongs are automatically engaged by the draw chain, the making of defective pipe which always occurs when there is any slip in the rapid operations of drawing a pipe after the tongs have been attached is avoided and prevented. The apparatus is simple and is easily kept in repair.

Modifications in the construction and arrangement of the parts may be made without departing from my invention as defined in the claims.

The draw bench may be stationary instead of swinging, as shown, and other changes may be made, within the scope of the claims.

I claim:—

1. Pipe drawing apparatus having tongs by which the pipe skelp is gripped and drawn through the welding bell comprising a draw bench having an endless chain thereon, means for continuously driving the chain, said chain having means engaging with the tong reins adapted to automatically grapple with the reins when the reins are placed in position on the draw bench and draw skelp in the grip of the tongs lengthwise over the draw-bench and means on the draw-bench adjacent to the reins engaging end thereof for preventing disengagement of the tong reins and chain.

2. Pipe drawing apparatus having tongs by which the pipe skelp is gripped and drawn through the welding bell comprising a draw bench having an endless chain thereon, means for continuously driving the chain, said chain having means automatically engaging with the tong reins adapted to grapple with the tong reins when the reins are placed in position on the draw bench and draw skelp in the grip of the tongs lengthwise over the draw bench and a keeper on the draw bench adjacent to the reins engaging end thereof movable into position to prevent disengagement of the tongs and chain.

3. Pipe drawing apparatus having tongs by which the pipe skelp is gripped and drawn through a welding bell comprising a swinging draw bench traversing the front of a welding furnace and having an endless chain thereon, means for swinging said draw bench and means for continuously driving the chain, said chain having means automatically engaging with the tong reins adapted to grasp the tong reins when the reins are placed in position on the draw bench and draw skelp in the grip of the tongs through a welding bell.

4. Pipe drawing apparatus having tongs by which the pipe skelp is gripped and drawn through a welding bell comprising a pivoted draw bench arranged to swing and traverse the front of a welding furnace, means for swinging the draw bench, means at separated intervals on the chain adapted to engage with the tong reins and draw pipe skelp gripped by the tongs through the pipe welding bell and a keeper on the swinging end of the draw bench movable into and out of position to prevent disengagement of the chain and tong reins when the chain grapples with the end of the tong reins at the beginning of the pipe drawing operations.

5. Pipe drawing apparatus having tongs by which the pipe skelp is gripped and drawn through a welding bell comprising a pivoted draw bench arranged to swing and traverse the front of a welding furnace, means for swinging the draw bench, and means at separated intervals on the chain adapted to automatically engage with the tong reins and draw pipe skelp gripped by the tongs lengthwise over the draw bench.

6. In a pipe-drawing apparatus, a draw-bench, an endless draw-chain having travel thereon, a welding die, skelp-engaging tongs, and one or more forked dogs having endless travel with the draw-chain and adapted to engage the end of said tongs while the chain is traveling and pull the skelp through the welding die.

7. In a pipe drawing apparatus, a draw bench, an endless draw chain having travel thereon, a welding die, skelp engaging tongs and means having endless travel with the draw chain and adapted to engage the end of said tongs while the chain is traveling and pull the skelp through the welding die.

8. Pipe-drawing apparatus having tongs by which the pipe skelp is gripped and drawn through the welding bell comprising a draw-bench having an endless chain, means for actuating said chain, and means on the chain adapted to automatically engage with the tong reins and draw skelp gage with the tong reins and draw skelp gripped by the tongs lengthwise over the draw-bench.

9. Pipe-drawing apparatus having tongs by which the pipe skelp is gripped and drawn through the welding bell comprising a draw-bench having an endless chain thereon, means for continuously driving the chain, and means automatically engaging with the tong reins adapted to grapple with the reins when the tongs are placed in position on the draw-bench and draw skelp in the grip of the tongs lengthwise over the draw-bench.

10. In a pipe drawing apparatus, the combination of a welding die, tongs adapted to pass through the die and to grip the skelp at one end and to be laid with its opposite end in the path of a traveling drawing means, and a traveling drawing means adapted to automatically engage such free end of the tongs when in its path and to draw the skelp through the die.

11. In a pipe drawing apparatus, the combination of a welding die, tongs adapted to grip the skelp at one side of the die and to extend through the die to the opposite side and a traveling grappling device adapted to automatically engage the free end of the tongs.

12. In a pipe drawing apparatus, the combination of tongs adapted to grip the skelp and a traveling grappling device, said device and said tongs being adapted for automatic engagement with each other.

13. In a pipe-drawing apparatus, a draw-bench, an endless draw-chain having travel thereon, a welding die, skelp engaging tongs, and means at a plurality of points in the length of the draw-chain and traveling therewith adapted to engage the end of said tongs while the chain is traveling and pull the skelp through the welding die.

In testimony whereof, I have hereunto set my hand.

AUGUSTUS M. SAUNDERS.

Witnesses:
C. H. STARR,
JAS. P. DAVIS.